United States Patent
Sands

(10) Patent No.: US 8,197,121 B2
(45) Date of Patent: Jun. 12, 2012

(54) BLENDER BLADE ASSEMBLY

(75) Inventor: Lenny Sands, Los Angeles, CA (US)

(73) Assignee: Bullet Express, LLC, Los Angeles, CA (US)

( * ) Notice: Subject to any disclaimer, the term of this patent is extended or adjusted under 35 U.S.C. 154(b) by 460 days.

(21) Appl. No.: 12/414,572

(22) Filed: Mar. 30, 2009

(65) Prior Publication Data

US 2010/0246320 A1 Sep. 30, 2010

(51) Int. Cl.
*B01F 7/00* (2006.01)
(52) U.S. Cl. ............ 366/246; 366/327.3; 366/251; 366/206; 366/199.12; 366/312; 241/199.12; 241/282.1
(58) Field of Classification Search .......... 366/205–206, 366/343, 241, 312, 327.3, 270; 241/199.12, 241/282.1
See application file for complete search history.

(56) References Cited

U.S. PATENT DOCUMENTS

| | | | |
|---|---|---|---|
| 2,284,155 A * | 5/1942 | Landgraf | 241/282.2 |
| 2,771,111 A * | 11/1956 | Seyfried | 241/292.1 |
| 3,156,278 A | 11/1964 | Otto | |
| 3,175,594 A | 3/1965 | Jepson et al. | |
| 3,216,473 A * | 11/1965 | Dewenter | 241/167 |
| 3,315,946 A | 4/1967 | Nissman | |
| 4,462,694 A | 7/1984 | Ernster et al. | |
| 4,480,796 A * | 11/1984 | Paraskevas | 241/46.11 |
| 5,487,511 A | 1/1996 | Sansone et al. | |
| 5,762,417 A * | 6/1998 | Essen et al. | 366/264 |
| 6,012,837 A | 1/2000 | Thuma | |
| 6,092,922 A * | 7/2000 | Kett et al. | 366/205 |
| D433,282 S * | 11/2000 | Bohannon et al. | D7/412 |
| 6,550,703 B2 * | 4/2003 | Williams et al. | 241/100 |
| 6,632,013 B2 | 10/2003 | Wulf et al. | |
| 6,666,574 B1 | 12/2003 | Pryor | |
| 6,834,818 B2 * | 12/2004 | Lee | 241/292.1 |
| D624,339 S * | 9/2010 | Chinuki et al. | D6/511 |
| D624,359 S * | 9/2010 | Schleinzer | D7/412 |
| 2006/0176771 A1 * | 8/2006 | Adams | 366/270 |
| 2008/0198691 A1 * | 8/2008 | Behar et al. | 366/205 |
| 2012/0080549 A1 * | 4/2012 | Rukavina | 241/282.1 |
| 2012/0091245 A1 * | 4/2012 | Menashes | 241/282.1 |
| 2012/0092953 A1 * | 4/2012 | Fung | 366/343 |

* cited by examiner

*Primary Examiner* — Joseph Del Sole
*Assistant Examiner* — Nahida Sultana
(74) *Attorney, Agent, or Firm* — Trojan Law Offices

(57) ABSTRACT

A blender blade assembly, blade unit, and blade assembly for mixing materials. Blender blade assembly includes a center portion that defines an axis of rotation for the assembly. The assembly includes a lower double-sided blade coupled to the center portion. The lower blade includes blade sections that extend from the center portion. In addition, the assembly includes an upper double-sided blade coupled to the center portion. The upper blade includes blade sections that extend from the center portion. The lower and upper blades are separated by a partition. One blade section of the upper blade has a top sheered portion and the other blade section has a bottom sheered portion. One blade section of the lower blade has a top sheered portion along with a blade tip pointed downwards, while the other blade section has a bottom sheered portion along with a blade tip pointed upwards.

15 Claims, 9 Drawing Sheets

BLENDER BLADE ASSEMBLY

FIELD OF THE APPLICATION

The present application relates to a blender and, more particularly, to a blender blade assembly having lower and upper blades, separated by a partition, with each blade having two blade sections and each blade section having either a top or bottom sheered leading edge.

BACKGROUND

The first electric blenders began to show up in the market place in the early 1920s. Blenders were often used to mix both liquids and solids to generate a homogeneously mix. Today, with the advent of margaritas and other drinks, current blenders have focused on developing new blades that effectively crush ice and mix the ice with liquids.

Blender blades are often configured to rotate about an axis of rotation. Blender blades normally include two blade sections extending in opposite directions from a center portion. The leading edges of the blade sections are provided with cutting edges, and the sections are oriented at compound angles with respect to the center portion to provide the blender blade with a compound angle of attack.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the present application a blender blade assembly is presented. The blender blade assembly includes a center portion. In addition, the assembly includes a lower double-sided blade coupled to the center portion having blade sections extending outwardly from the center portion. Furthermore, the assembly includes an upper double-sided blade coupled to the center portion having blade sections extending outwardly from the center portion. The upper double-sided blade is separated from the lower double-sided blade.

In accordance with another aspect of the present application, a blade unit for a blender is presented. The blade unit includes a lower blade having curved blade sections. Each curved blade section has an arcuately curved, concave leading edge and an arcuately curved, concave trailing edge, the concavity of which is shallower than the concavity of said leading edge. In addition, the unit includes an upper blade having curved blade sections. Each curved blade section has an arcuately curved, concave leading edge and an arcuately curved, concave trailing edge, the concavity of which is shallower than the concavity of said leading edge. The upper blade affixed above said lower blade does not contact the lower blade.

In accordance with yet another aspect of the present application, a blade assembly is presented. The assembly includes a first blade having first and second blade sections. The first blade section includes a top sheered portion and the second blade section includes a bottom sheered portion. In addition, the assembly includes a first blade having first and second blade sections. The first blade section includes a top sheered portion with a blade tip curving upwards. The second blade section includes a bottom sheered portion with a blade tip curving downwards.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures may be shown in exaggerated or generalized form, in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The detailed description set forth below in connection with the appended drawings is intended as a description of presently-preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

Generally described, the present application relates to a blender. More specifically, the present application relates to a blender blade assembly. In one illustrative embodiment, the blender blade assembly includes a center portion that defines an axis of rotation for the assembly. The assembly includes a lower double-sided blade coupled to the center portion. The lower blade includes two blade sections that extend from the center portion. In addition, the assembly includes an upper double-sided blade coupled to the center portion. The upper blade includes two blade sections that extend from the center portion. The lower and upper blades are separated by a partition. While the illustrative embodiment recited general features of the blade assembly, more detailed features will be presented in light of the FIGURES provided below.

Figure 1:
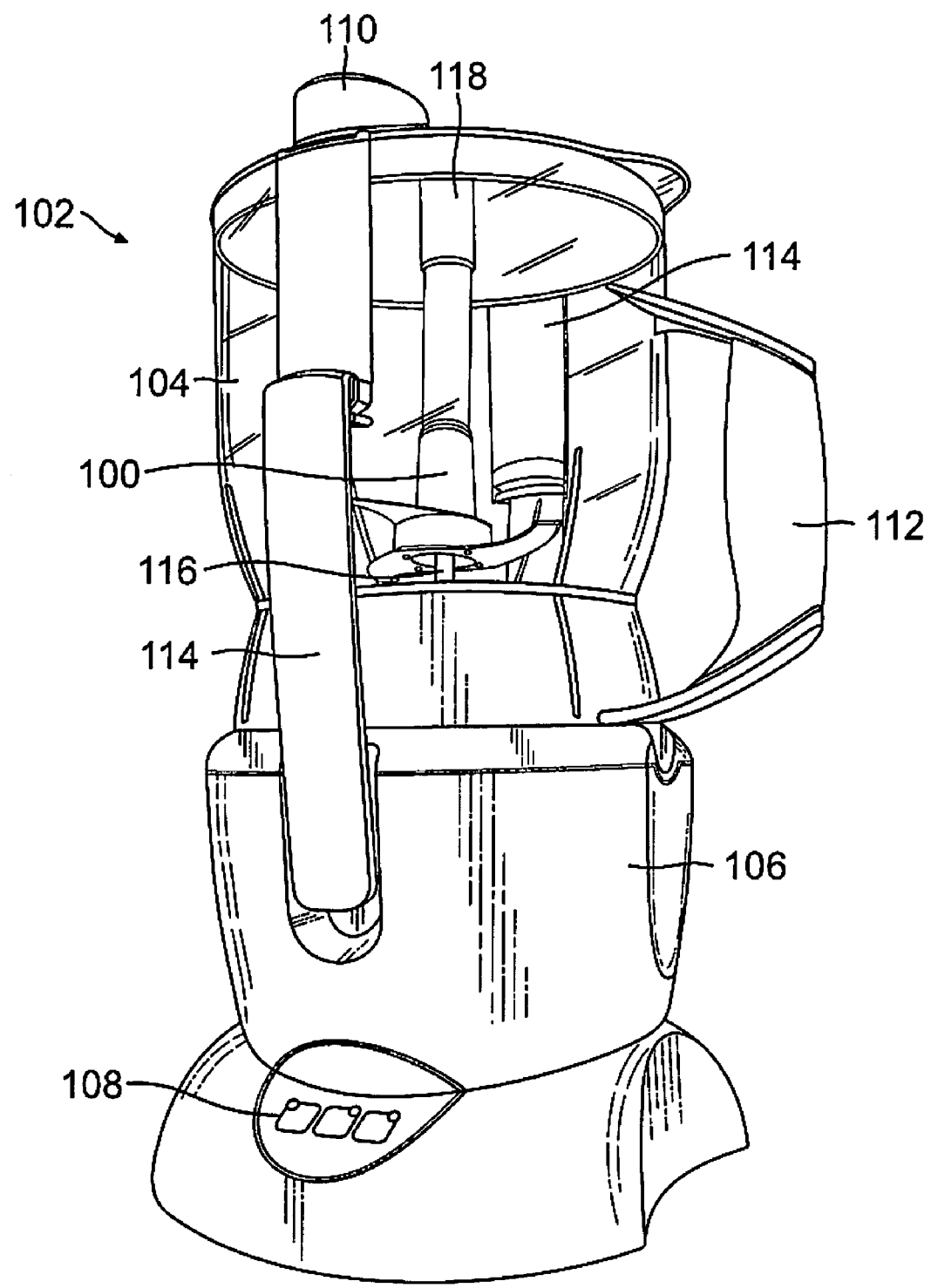
FIG. 1 is an illustrative blender with an exemplary blender blade assembly in accordance with one aspect of the present application.

FIG. 1 illustrates a typical blender 102 in which blender blade assembly 100 can be used. As shown, blender 102 includes a container 104. Container 104 can be coupled to blender base 106 by securing straps 114. In this embodiment, there are two securing straps 114. Alternatively, a single strap 114 can be used. In such a case, strap 114 extends from one side of container 104 to the other side of container 104. While straps to secure container 104 to blender base 106 are shown, one skilled in the relevant art will appreciate that there are numerous ways to secure container 104 to base 106.

In preferred embodiments, coupled to container 104 is handle 112. Handle 112 allows for contents within container 104 to be easily poured. Also connected to container 104 is lid 110. Lid 110 prevents contents within container 104 from coming out. Typically, lid 110 is removable from container 104. Lid 110 may be locked to the opening of container 106 via a cap locking device. The cap locking device may be an L-shaped ridge located at the lip of the container 106.

Furthermore, in one embodiment, lid 110 includes a blade fastener 118. In this embodiment, blade fastener 118 tightly secures assembly 100 from falling out of place within container 104 when being rotated.

Also within container 104 is rotatable shaft 116. Shaft 116 can include a latch for mounting assembly 100 to blender 102. As will become apparent in the subsequent discussion, the rotatable shift 116 will spin blade 100 so that contents within container 104 can be mixed.

Base 106 can include control buttons 108. Buttons 108 allow a user to select the desired speed and type of materials the user wishes to mix together. In typical settings, three buttons are provided: stop, slow, and fast.

Placed within container 104 is blade assembly 100. Blade assembly 100 agitates contents placed within container 104. In the assembly 100 described in this application, assembly 100 includes four cutting elements. The cutting elements are generally flat members that have sharpened edges, some of which have pointed tips.

Figure 2:
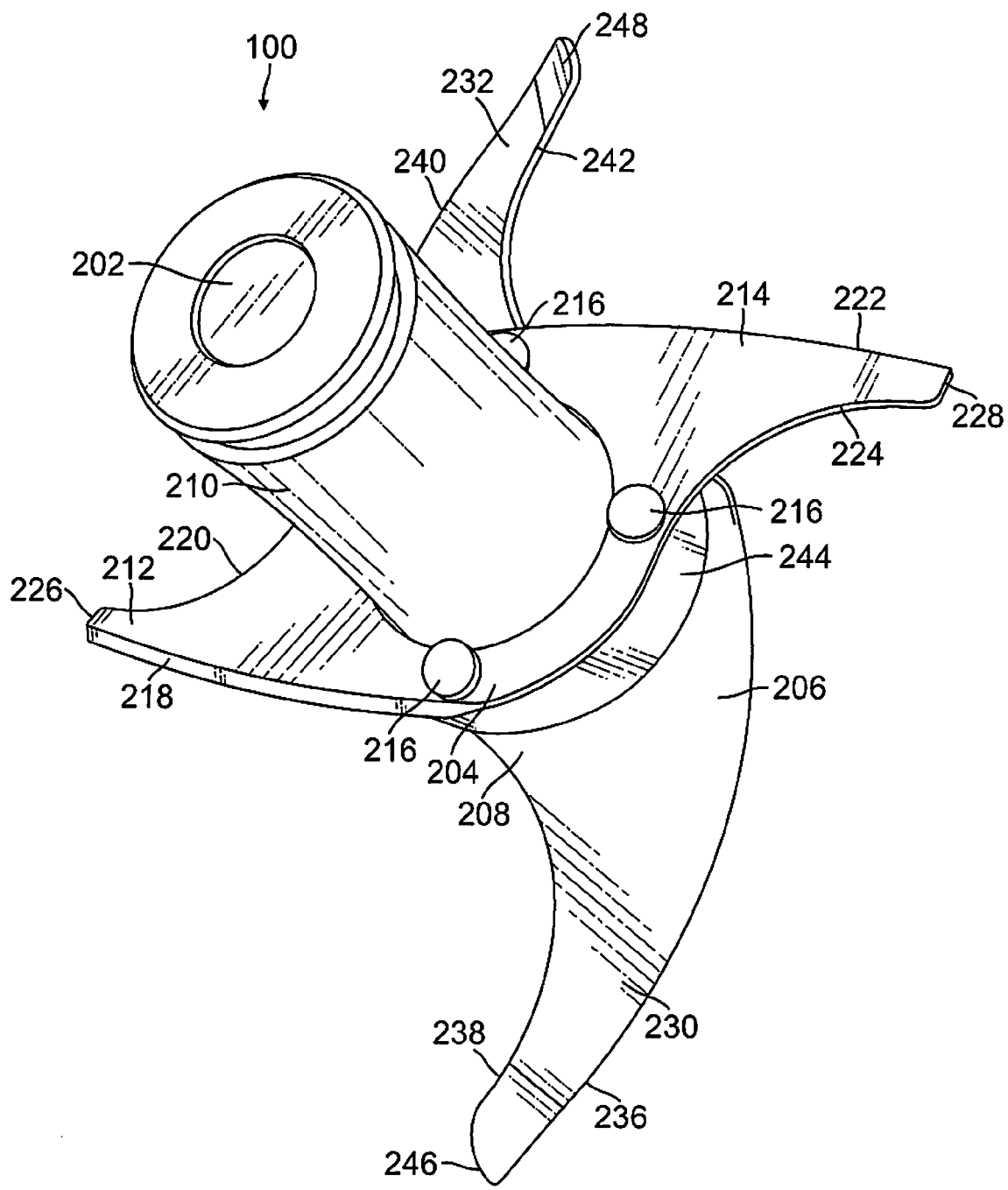
FIG. 2 is a top perspective view of the exemplary blender blade assembly in accordance with one aspect of the present application.

With reference now to FIG. 2, a top perspective view of assembly 100 is presented. Beginning at a top portion of assembly 100 is knob 202. Typically, knob 202 can be engaged by blade fastener 118 as described above. Blade fastener 118 holds down assembly 100 preventing assembly 100 from spinning out of control. As shown on knob 202, a sunken inlet along with multiple rims allows for blade fastener 118 to control assembly 100 from spinning out of control. In other embodiments, knob 202 does not include the sunken inlet along with the multiple rims to control assembly 100. Instead, assembly 100 can be controlled at the bottom or through some other similar mechanism.

Knob 202 can be used for inserting and removing assembly 100. As shown in FIG. 2, the sharp edges are located well below knob 202. In other embodiments, a tool can be used to remove assembly 100 into and out of container 104.

Coupled to knob 202 is center portion 210. Center portion 210 defines the center of rotation in which assembly 100 can be spun. In addition, multiple blades will be coupled to center portion 210.

Continuing with FIG. 2, assembly 100 includes first blade 204 and second blade 206. First blade 204 is typically above second blade 206 and can also be referred to as upper blade 204. Second blade 206 is generally below first blade 204 and can be referred to as lower blade 206.

Upper blade 204 can include first blade section 212 and second blade section 214. Typically, first and second blade sections 212 and 214 are attached to each other and come in one piece. Alternatively, first blade and second blade sections 212 and 214 can come in two pieces.

First and second blade sections 212 and 214 can be coupled to center portion 210 by a first set of fasteners 216. These fasteners 216 can take the form of bolts, screws, nails, etc. As provided in FIG. 2, four fasteners 216 are provided. Alternatively, blade sections 212 and 214 can be attached to center portion 210 with glue or some other adhesive.

Preferably, blade 204 sits atop a protruded portion 244 of center 210. This protruded portion allows blade 204 to be tightly secured to center portion 210. In one embodiment, the aforementioned first set of fasteners 216 can be placed into a top portion of upper blade 204 to secure blade 204 into center 210.

As shown in FIG. 2, blade section 212 can have an arcuately curved, concave leading edge 218 and an arcuately curved, concave trailing edge 220. The curved edges 218 and 220 allow materials to be sliced within container 104 while allowing materials to easily slide off.

Typically, the concavity of the trailing edge 220 is shallower than the concavity of the leading edge 218. This often produce less drag on blade section 212 as it is spun around the axis of rotation defined by center portion 210.

Also, blade section 214 generally will have an arcuately curved, concave leading edge 222 and an arcuately curved, concave trailing edge 224. Again, the concavity of the trailing edge 224 is shallower than the concavity of the leading edge 222.

Preferably, blade section 212 will generally take on the same form of blade section 214. Because first blade section 212 and second blade section 214 are spun around quickly, the similarity will allow blade 204 to spin around its center of rotation without producing any irregular effects.

At the end of first blade section 212 and second blade section 214 are blade tips 226 and 228, respectively. Blade tips 226 and 228, as shown, can be flat. Alternatively, blade tips 226 and 228 can be pointed in an upwards or downwards direction.

Continuing with FIG. 2, partition 208 separates upper blade 204 from lower blade 206. Partition 208 allows for materials to pass through upper blade 204 and lower blade 206. Nonetheless, materials between upper blade 204 and lower blade 206 will typically not be between blades 204 and 206 for too long. As will be described below, the sheered edges of blades 204 and 206 will either push the materials upwards or downwards. Preferably, partition 208 is small. The width of partition 208 generally matches the width of the center of upper blade 204 and lower blade 206 so that no materials can be trapped between them.

Second blade 206 can be coupled to the bottom of center portion 210. Blade 206 includes first blade section 230 and second blade section 232. Typically, first and second blade sections 230 and 232 are attached to each other and come in one piece. Alternatively, first blade section 230 and second blade section 232 can come in two pieces.

Figure 3:
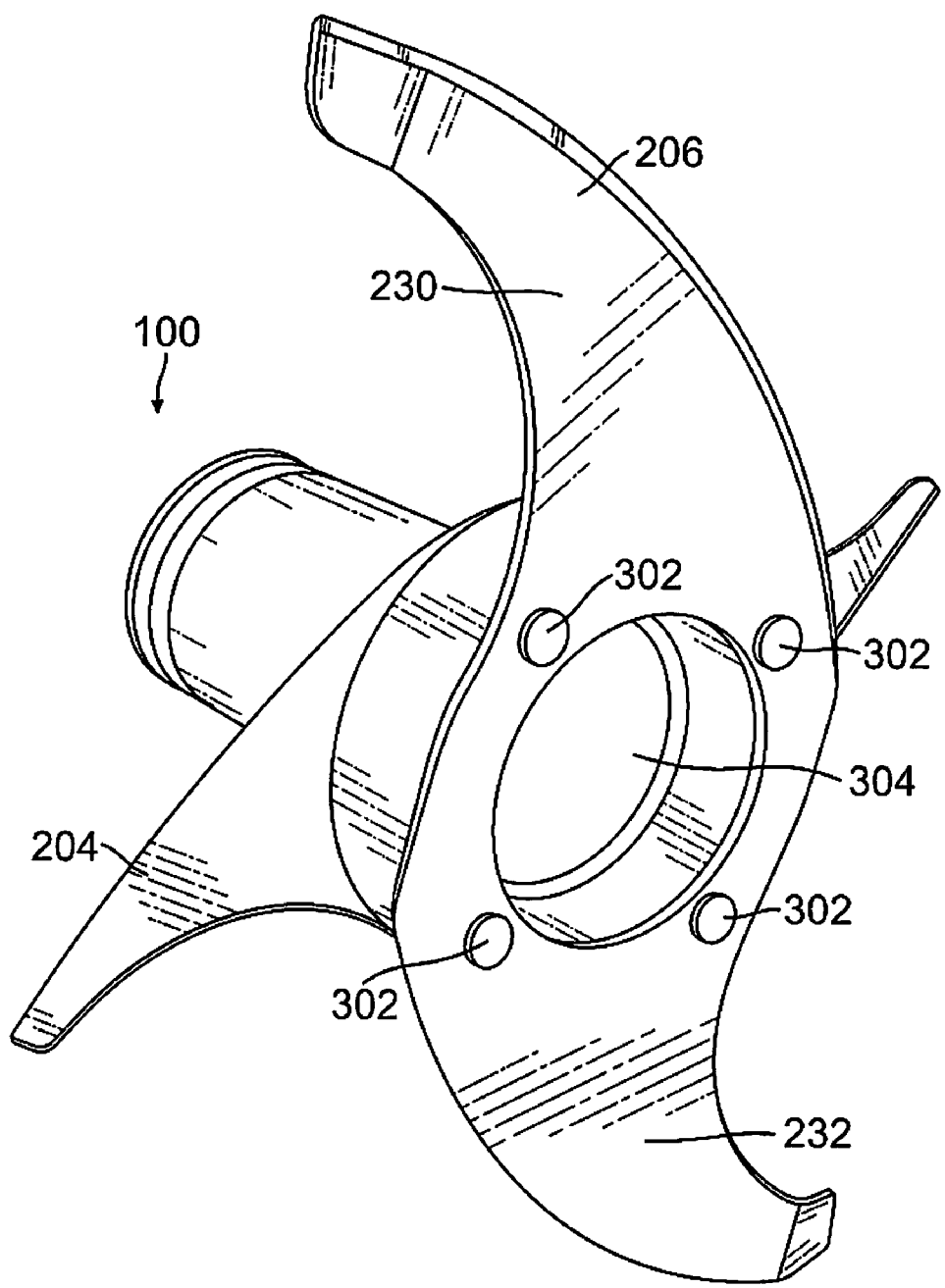
FIG. 3 is a bottom perspective view of the exemplary blender blade assembly in accordance with one aspect of the present application.

First and second blade sections 230 and 232 can be coupled to center portion 210 by a second set of fasteners 302 as shown in FIG. 3. These fasteners 302 can take the form of bolts, screws, nails, etc. Alternatively, blade sections 228 and 230 can be attached to center portion 210 with glue or similar type of adhesive.

Returning to FIG. 2, first blade section 230 of blade 206 can have an arcuately curved, concave leading edge 236 and an arcuately curved, concave trailing edge 238. The curved edges 236 and 238 allow materials to be sliced within container 104. Any materials stuck on leading edge 236 will slide off first blade section 230 as a result of the curved edge 236.

Typically, the concavity of the trailing edge 238 is shallower than the concavity of the leading edge 236. Often this produces less drag on blade section 230 as it is spun around its axis of rotation defined by the center portion 210.

Blade section 232 of lower blade 206 generally will also have an arcuately curved, concave leading edge 240 and an arcuately curved, concave trailing edge 242. The curved edges 240 and 242 allow the materials placed within container 104 to be sliced. Generally, the concavity of the trailing edge 242 is shallower than the concavity of the leading edge 240.

Preferably, blade section 230 will take on the same form of blade section 232. Because first blade section 230 and second blade section 232 are spun around quickly, the similarity will allow blade 206 to spin around its center of rotation without producing any irregular effects.

At the end of first blade section 230 and second blade section 232 are blade tips 246 and 248, respectively. Blade tip 246 for blade section 230 is pointed in a downwards direction, while blade tip 248 for blade section 232 is pointed in an upwards direction. One skilled in the relevant art will appreciate that blade tips 246 and 248 can provide beneficial aspects to assembly 100. Alternatively, blade tips 246 and 248 can be flat or point in differing directions.

Returning to FIG. 3, a bottom perspective view of blade assembly 100 is presented. As shown, upper blade 204 is generally smaller than lower blade 206. Because of this, material within container 104 can pass by upper blade 204 yet still be mixed by lower blade 206. In other embodiments, upper blade 204 has the same size of lower blade 206.

Bottom perspective view of assembly 100 shows an insertion point 304 for rotatable shaft 116. Insertion point 304 includes a cylindrical aperture. One skilled in the relevant art will appreciate that insertion point 304 can be provided in many different forms and shapes. Furthermore, assembly 100 can be rotated in a variety of different ways.

Figure 4:
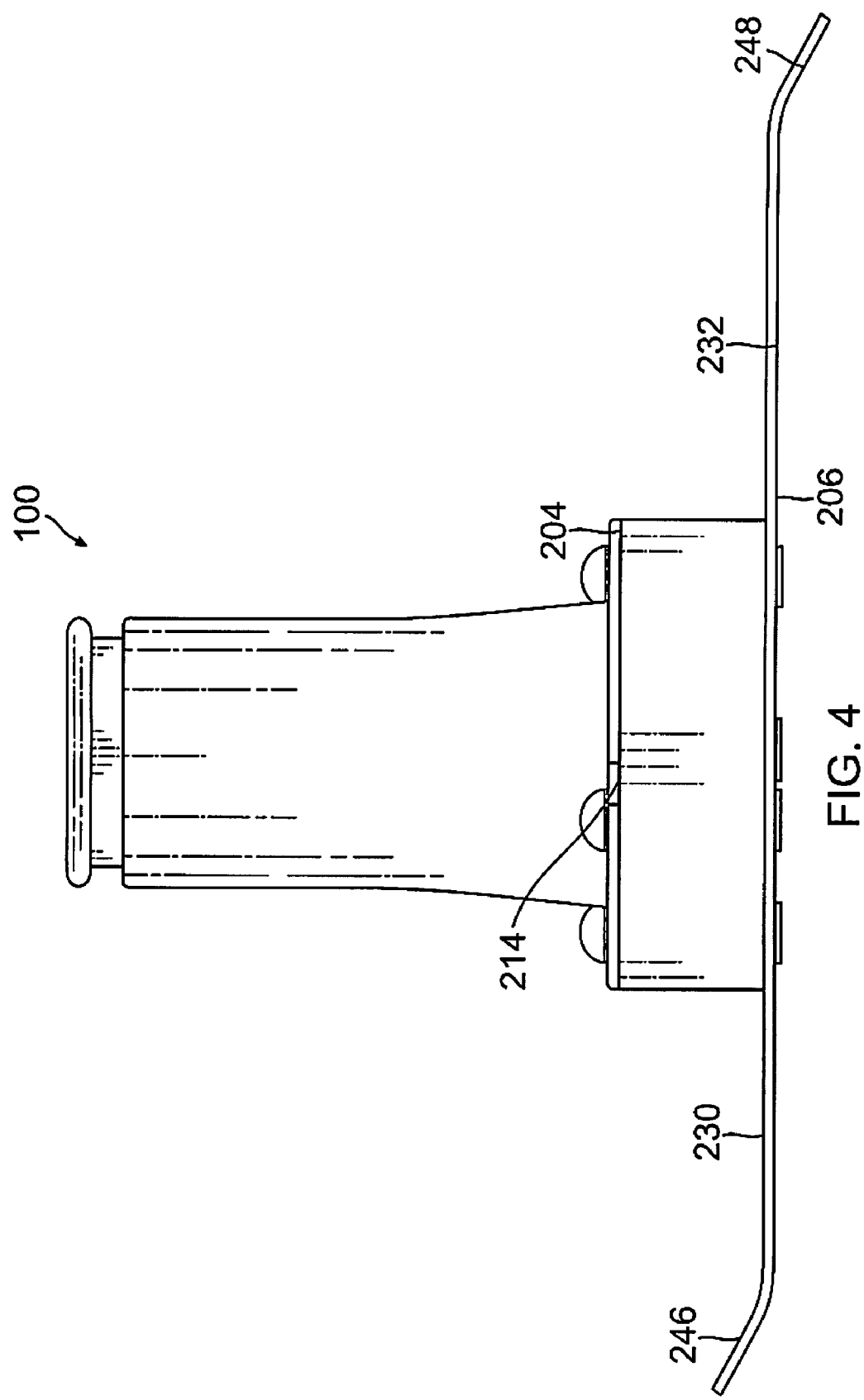
FIG. 4 is a front view of the exemplary blender blade assembly in accordance with one aspect of the present application.

FIG. 4 is a front view of assembly 100. As depicted, lower blade 206 includes first blade section 230 and second blade section 232. First blade section 230 has an upwards pointed tip 246, while second blade section 232 has a downwards pointed tip 248. When rotated, tips 246 and 248 of blade 206 push materials up or down dependent on what direction the tips 246 and 248 are pointed. Also shown in FIG. 4, blade section 214 of upper blade 204 generally does not have pointed tips. Instead, blade section 214 lets gravity displace the material within container 104.

Figure 5:
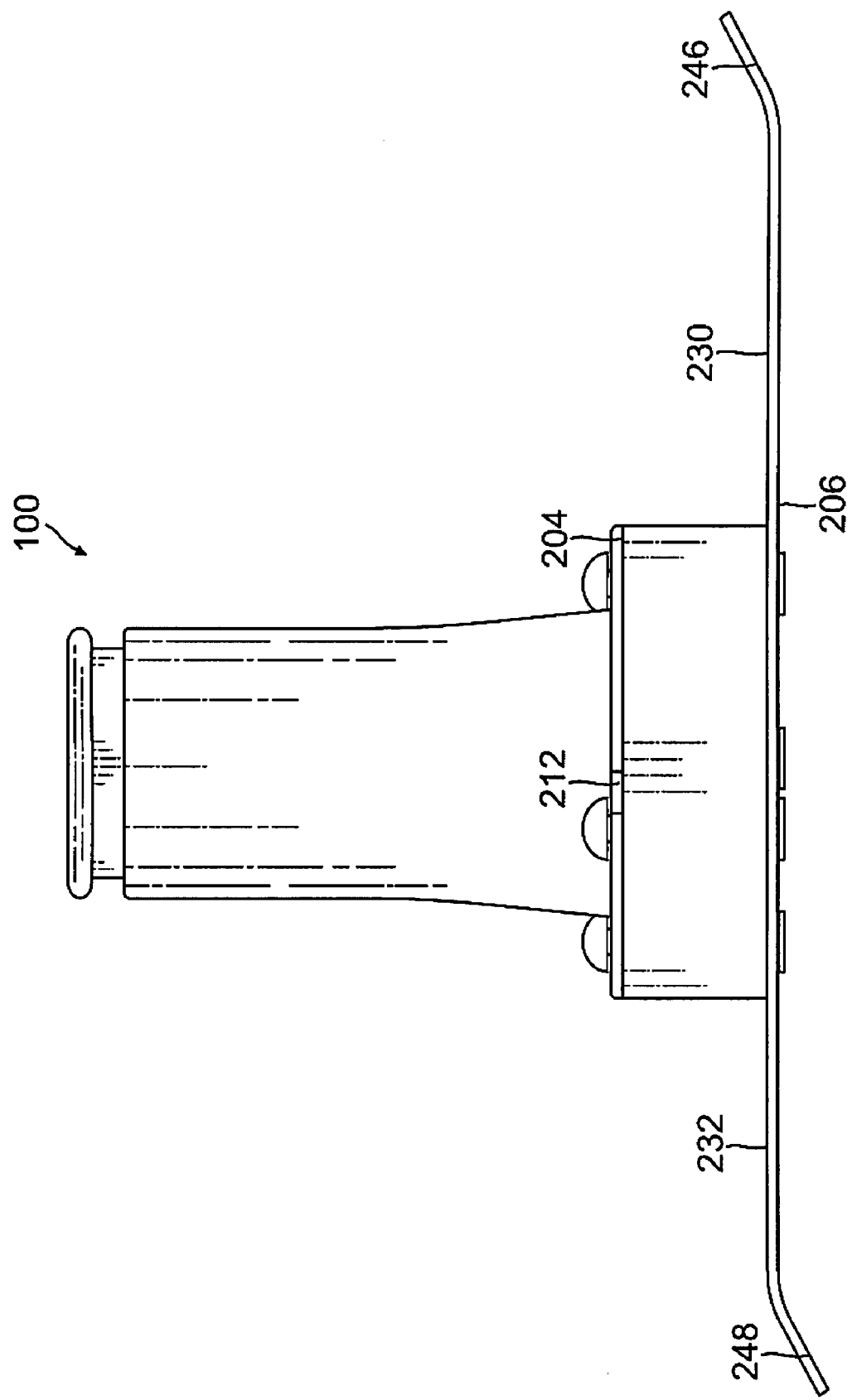
FIG. 5 is a back view of the exemplary blender blade assembly in accordance with one aspect of the present application.
Figure 6:
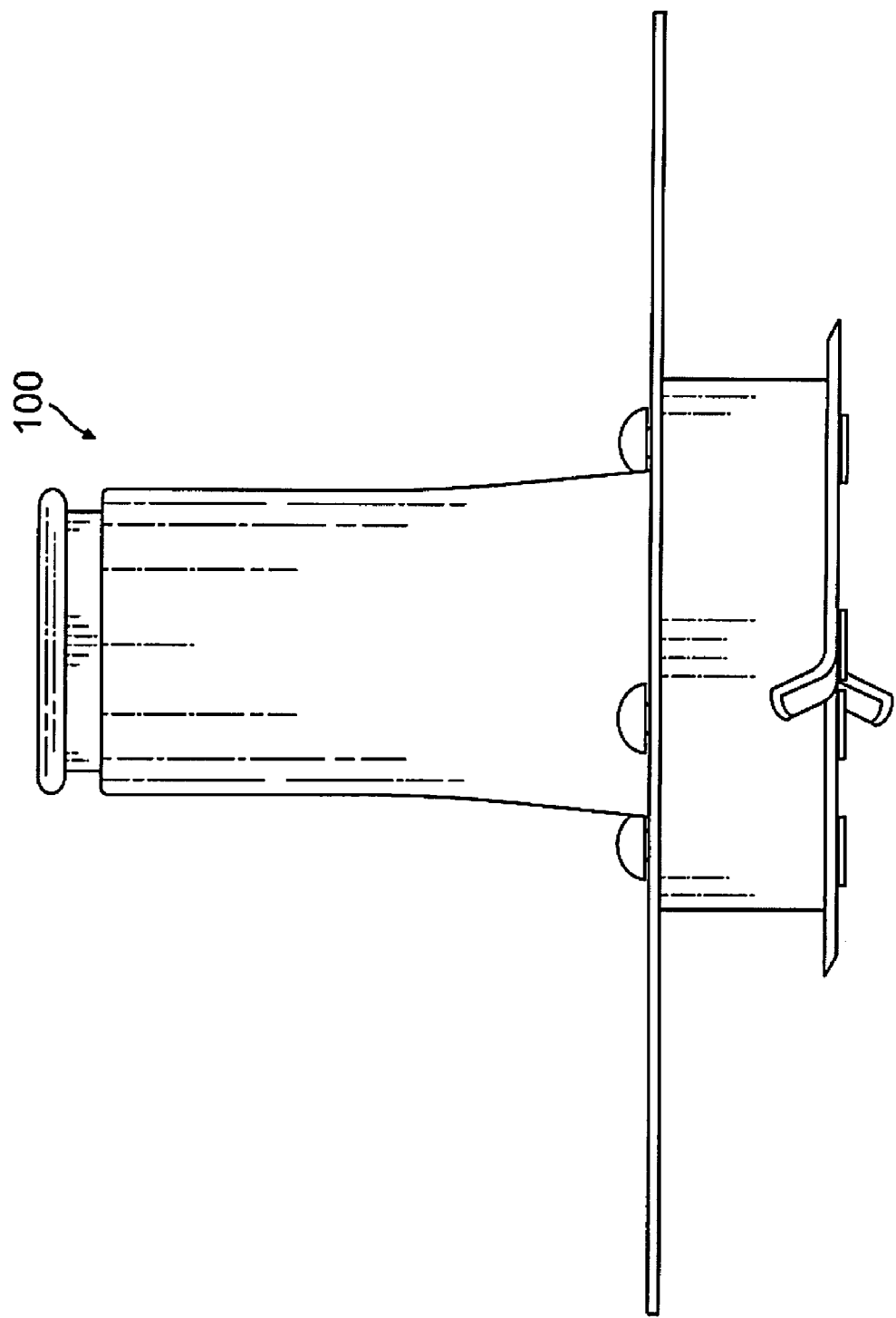
FIG. 6 is a side view of the exemplary blender blade assembly in accordance with one aspect of the present application.
Figure 7:
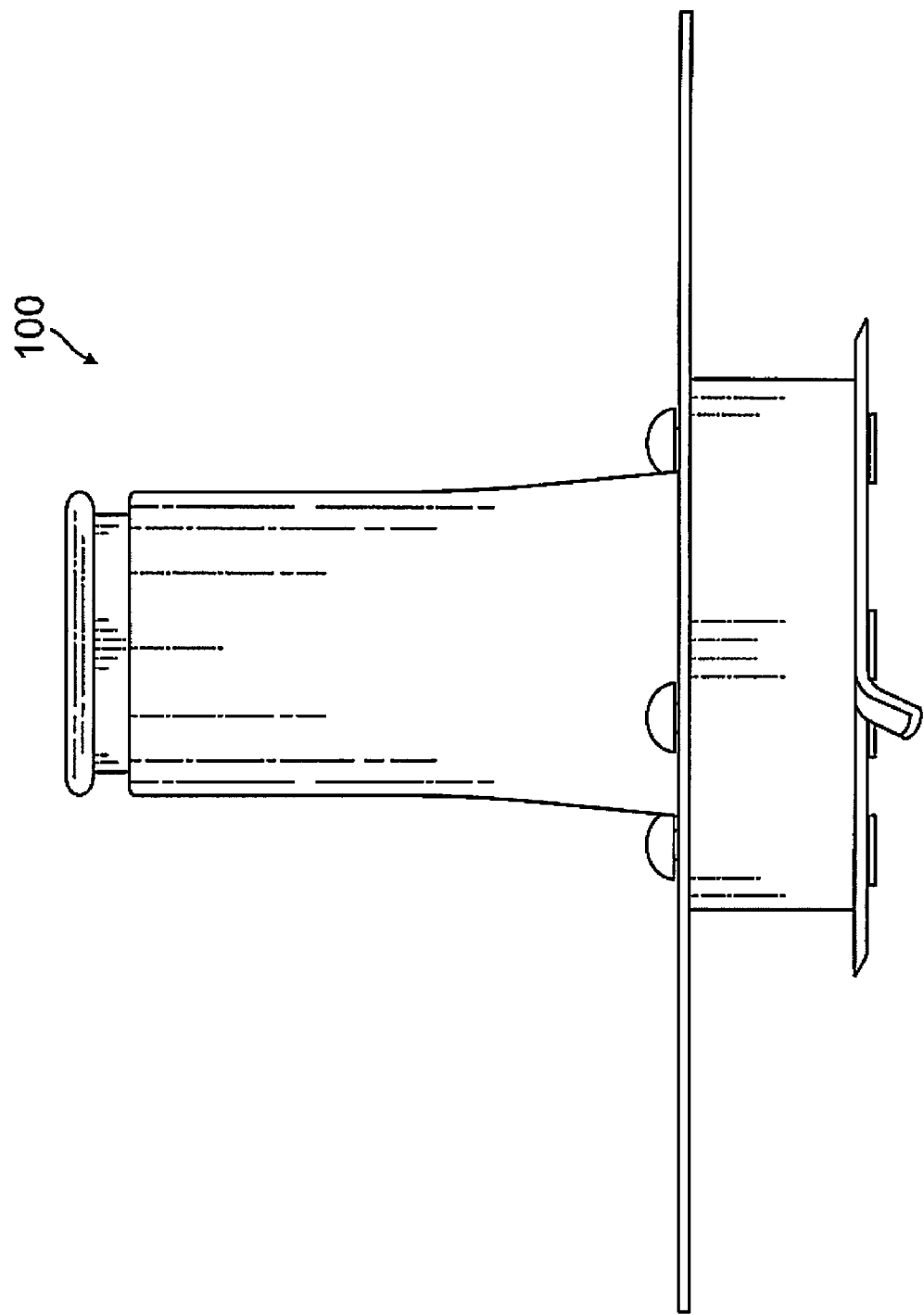
FIG. 7 is a side view of the exemplary blender blade assembly in accordance with one aspect of the present application.

FIG. 5 is a back view of assembly 100. On the other side of assembly 100, upper blade 204 again shows no pointed blade tip for blade section 212. Lower blade 206 shows pointed tips 246 and 248 of blade section 230 and blade section 232, respectively. FIG. 6 is a side view of assembly 100. FIG. 7 is another side view of blade assembly 100.

Figure 8:
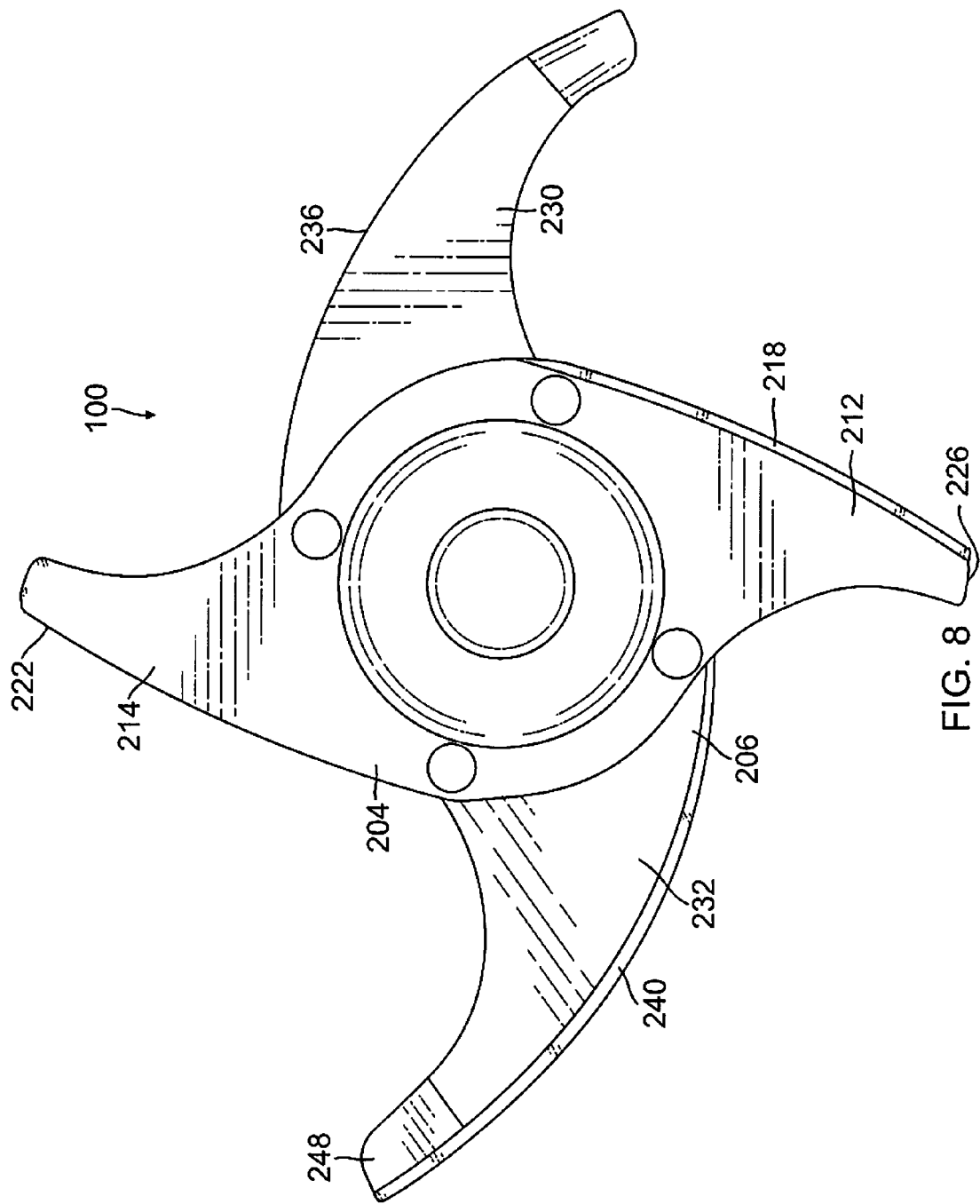
FIG. 8 is a top view of the exemplary blender blade assembly in accordance with one aspect of the present application.

While specific features of blade sections 212 and 214 of upper blade 204 and blade sections 230 and 232 of lower blade 206 have been discussed in the previous FIGURES, FIG. 8, a top view of assembly 100, provides a more comprehensive description of the sheered portions for each blade section 212, 214, 230, and 232. With reference now to blade section 212 of upper blade 204, a sheered section is provided for on leading edge 218. The sheer section is placed on top of blade section 212. The sheered section allows for blade section 212 to cut materials and force the materials in an upwards direction. Typically, the sheer section can extend all the way down to blade tip 226.

Figure 9:
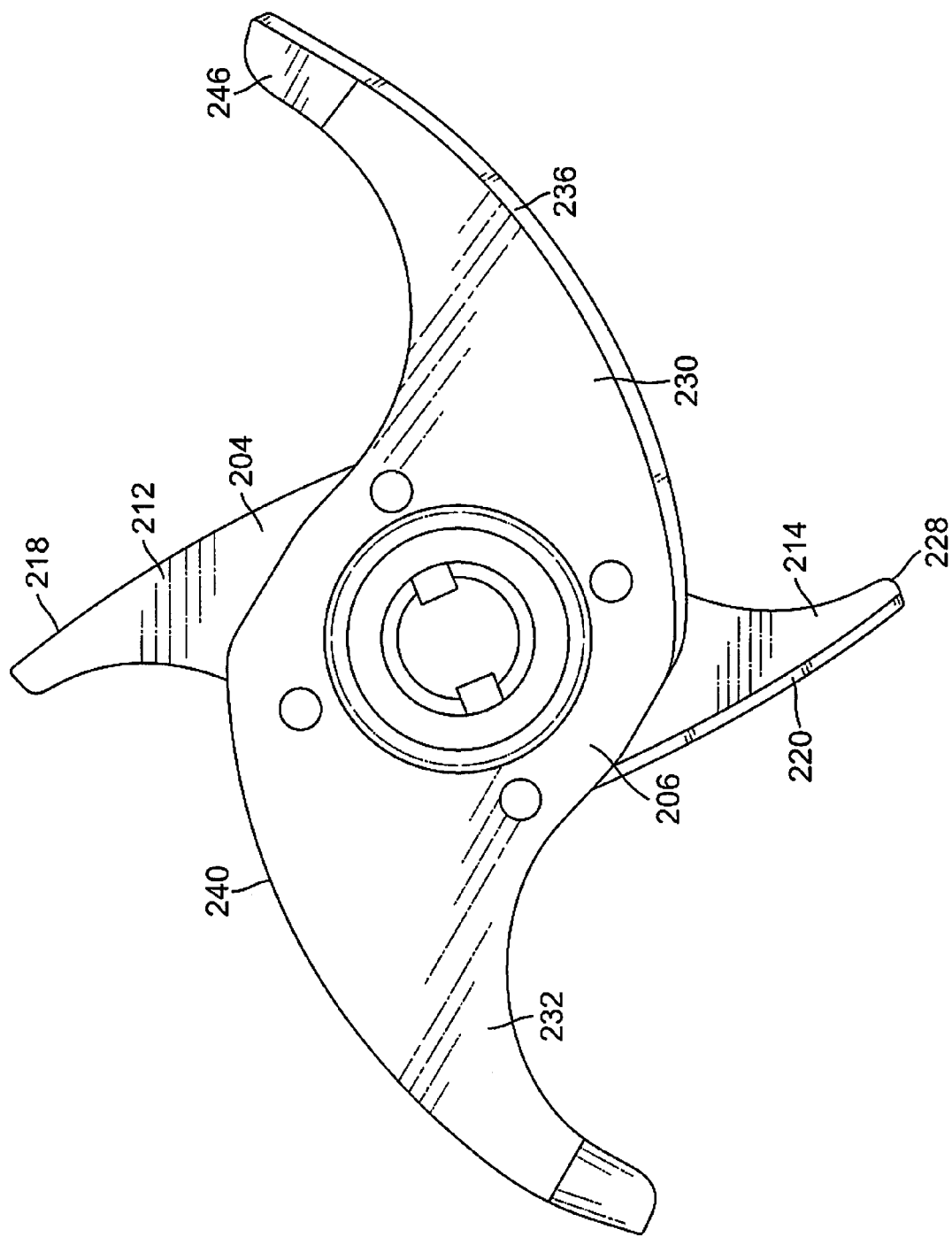
FIG. 9 is a bottom view of the exemplary blender blade assembly in accordance with one aspect of the present application.

Blade section 214 of upper blade 204 also has a sheered section on its leading edge 220 shown in FIG. 9, which depicts a bottom view of assembly 100. In this case, however, the sheer section is on the bottom of blade section 214. When the materials are cut by blade section 214, the materials will be forced in a downwards direction. Generally, the sheer section can extend all the way down to blade tip 228.

Returning to FIG. 8, blade section 232 of lower blade 206 can also have a sheered section. The sheered section is placed on leading edge 240 of blade section 232. The sheer section is placed on a top portion of blade section 232. When the materials are cut by blade section 232, the materials will be forced to move in an upwards direction. Generally, the sheered section can extend all the way down to blade tip 248.

Returning to FIG. 9, blade section 230 of lower blade 206 can also have a sheered section. The sheered section is placed on leading edge 236 of blade section 230. The sheered section is placed on a bottom portion of blade section 230. When the materials are cut by blade section 230, the materials will be forced to move in a downwards direction. Typically, the sheered section can extend all the way down to blade tip 246.

As shown in FIGS. 8 and 9, blade sections 230 and 232 of lower blade 206 and blade sections 212 and 214 of upper blade 204 are perpendicular to each other. As a result, this forms ninety degree angles between each blade section. When viewed from the top, leading edge 218 of the first blade section 212 of the first blade 204 is ninety degrees counterclockwise behind the leading edge 236 of the second blade 230 section of the second blade 206. The leading edge 236 of the second blade section 230 of the second blade 206 is ninety degrees counterclockwise behind the leading edge 222 of the second blade section 214 of the first blade 204. The leading edge 222 of the second blade section 214 of the first blade 204 is ninety degrees counterclockwise behind the leading edge 240 of the first blade section 232 of the second blade 206. The leading edge 240 of the first blade section 232 of the second blade 106 is ninety degrees counterclockwise behind the leading edge 218 of the first blade section 212 of the first blade 204.

Assembly 100 can be made of many different materials. Preferably, however, blades 204 and 206 are made of steel. Steel prevents the blades from being bent by tough or rigid materials placed within container 104. Center portion 210 can be made of plastic or a composite thereof. One skilled in the relevant art will appreciate that assembly 100 can be made of a variety of materials and is not limited to those materials described herein. Furthermore, while assembly 100 is designed to rotate in a counterclockwise rotation, one skilled in the relevant art will appreciate that assembly 100 can be designed to rotate in a clockwise rotation.

In accordance with one aspect of the present application, a blender blade assembly 100 is presented. The assembly 100 includes a center portion 210. In addition, the assembly 100 includes a lower double-sided blade 206 coupled to the center portion 210 having blade sections 230 and 232 extending outwardly from the center portion 210. Furthermore, the assembly 100 includes an upper double-sided blade 204 coupled to the center portion 210 having blade sections 212 and 214 extending outwardly from the center portion 210. The upper double-sided blade 204 is separated from said lower double-sided blade 206.

In one embodiment, the center portion 210 further includes a latch for mounting the blade assembly 100 to a blender 102. In another embodiment, the blender blade assembly 100 includes a first set of fasteners 216 for the upper double-sided blade 204 and a second set of fasteners 302 for the lower double-sided blade 206. In another embodiment, the blender blade assembly 100 includes a knob 202 for allowing insertion and extraction of the blender blade assembly 100.

In accordance with another aspect of the present application, a blade unit 100 for a blender 102 is presented. The unit 100 includes an upper blade 204 having curved blade sections 212 and 214. Each curved blade section 212 and 214 has an arcuately curved, concave leading edge 218 and 222 and an arcuately curved, concave trailing edge 220 and 224. The concavity of the trailing edges 220 and 224 are shallower than the concavity of the leading edges 218 and 222.

In addition, the unit 100 includes a lower blade 206 having curved blade sections 230 and 232. Each curved blade section 230 and 232 has an arcuately curved, concave leading edge 236 and 240 and an arcuately curved, concave trailing edge 238 and 242, the concavity of which is shallower than the concavity of said leading edge 236 and 240. The lower blade 206 is affixed below the upper blade 204 and is not contacting therewith.

In one embodiment of blade unit 100, the lower blade sections 230 and 232 include blade tips 246 and 248 for each blade section 230 and 232. In another embodiment, a first blade section 232 of the lower blade 206 includes a top sheer on its concave leading edge 240 and the second blade section 230 of the lower blade 206 includes a bottom sheer on its concave leading edge 236.

In yet another embodiment, the first blade section 232 of the lower blade 206 includes a blade tip 248 curving upwards and the second blade section 230 of the lower blade 206 includes a blade tip 246 curving downwards. In still yet another embodiment, the first blade section 212 of the upper blade 204 includes a top sheer on its concave leading edge 218 and the second blade section 214 of the upper blade 204 includes a bottom sheer on its concave leading edge 222. In another embodiment, the lower blade 206 has an effective length greater than the upper blade 204. In another embodiment, the blade sections 230 and 232 of the lower blade 206 and the blade sections 214 and 216 of the upper blade 204 are perpendicular.

In accordance with another aspect of the present application, a blade assembly 100 is presented. Blade assembly 100 includes a first blade 204 having first and second blade sections 212 and 214, wherein the first blade section 212 includes a top sheered portion and the second blade section 214 includes a bottom sheered portion. In addition, blade assembly 100 includes a second blade 206 having first and second blade sections 232 and 230, wherein the first blade section 232 includes a top sheered portion with a blade tip 248 curving upwards and the second blade section 230 includes a bottom sheered portion with a blade tip 246 curving downwards.

In one embodiment, blade assembly 100 also includes a partition 208 separating the first blade 204 and the second blade 206. In another embodiment, the first blade 204 is positioned above the second blade 206. In another embodiment, the blade sections 212, 214, 230, and 232 for the first and second blades 204 and 206 are positioned within ninety degrees of each other. In another embodiment, the leading edge 218 of the first blade section 212 of the first blade 204 is ninety degrees counterclockwise behind the leading edge 236 of the second blade section 230 of the second blade 206. In yet another embodiment, the leading edge 236 of the second blade section 230 of the second blade 206 is ninety degrees counterclockwise behind the leading edge 222 of the second blade section 214 of the first blade 204. In yet another embodiment, the leading edge 222 of the second blade section 214 of the first blade 204 is ninety degrees counterclockwise behind the leading edge 240 of the first blade section 232 of the second blade 206. In another embodiment, the leading edge 240 of the first blade section 232 of the second blade 206 is ninety degrees counterclockwise behind the leading edge 218 of the first blade section 212 of the first blade 204.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A blender blade assembly comprising:
   a knob for allowing insertion and extraction of the blender blade assembly;
   a center portion for mounting the blender blade assembly to a blender;
   a lower double-sided blade coupled to the center portion having first and second blade sections extending outwardly from the center portion, wherein each blade section includes blade tips, the first blade section of the lower blade having a top sheer having an angle sufficient to force materials in an upward direction on its concave leading edge and the second blade section of the lower blade having a bottom sheer on its concave leading edge having an angle sufficient to force materials in a downward direction; and
   an upper double-sided blade coupled to the center portion having first and second blade sections extending outwardly from the center portion, wherein the upper double-sided blade is separated from said lower double-sided blade, the first blade section of the upper blade having a top sheer having an angle sufficient to force materials in an upward direction on its concave leading edge and the second blade section of the upper blade having a bottom sheer edge having an angle sufficient to force materials in a downward direction on its concave leading edge.

2. A blade unit for a blender comprising:
   an upper blade having first and second curved blade sections, each said curved blade section having an arcuately curved, concave leading edge and an arcuately curved, concave trailing edge, the concavity of which is shallower than the concavity of said leading edge; and
   a lower blade having first and second curved blade sections, each said curved blade section having an arcuately curved, concave leading edge and an arcuately curved, concave trailing edge, the concavity of which is shallower than the concavity of said leading edge, said lower blade affixed below said upper blade and not contacting therewith,
   wherein the first blade section of the lower blade includes a top sheer edge having an angle sufficient to force materials in an upward direction on its concave leading edge and the second blade section of the lower blade includes a bottom sheer edge having an angle sufficient to force materials in a downward direction on its concave leading edge.

3. The blade unit of claim 2, wherein the lower blade sections further comprise blade tips for each blade section.

4. The blade unit of claim 2, wherein the first blade section of the lower blade includes a blade tip curving upwards and the second blade section of the lower blade includes a blade tip curving downwards.

5. The blade unit of claim 2, wherein the first blade section of the upper blade includes a top sheer on its concave leading edge and the second blade section of the upper blade includes a bottom sheer on its concave leading edge.

6. The blade unit of claim 2, wherein the lower blade has an effective length greater than the upper blade.

7. The blade unit of claim 2, wherein the blade sections of the lower blade and the blade sections of the upper blade are perpendicular.

8. A blade assembly comprising:
   a first blade having first and second blade sections, wherein the first blade section includes a top sheered portion edge having an angle sufficient to force materials in an upward direction and the second blade section includes a bottom sheered portion edge having an angle sufficient to force materials in a downward direction; and
   a second blade having first and second blade sections, wherein the first blade section includes a top sheered portion edge having an angle sufficient to force materials in an upward direction with a blade tip curving upwards and the second blade section includes a bottom sheered portion edge having an angle sufficient to force materials in a downward direction with a blade tip curving downwards.

9. The blade assembly of claim 8, further comprising a partition separating the first blade and the second blade.

10. The blade assembly of claim 9, wherein the first blade is positioned above the second blade.

11. The blade assembly of claim 9, wherein the blade sections for the first and second blades are positioned within ninety degrees of each other.

12. The blade assembly of claim 11, wherein a leading edge of the first blade section of the first blade is ninety degrees counterclockwise behind the leading edge of the second blade section of the second blade.

13. The blade assembly of claim 12, wherein the leading edge of the second blade section of the second blade is ninety degrees counterclockwise behind the leading edge of the second blade section of the first blade.

14. The blade assembly of claim 13, wherein the leading edge of the second blade section of the first blade is ninety degrees counterclockwise behind the leading edge of the first blade section of the second blade.

15. The blade assembly of claim 14, wherein the leading edge of the first blade section of the second blade is ninety degrees counterclockwise behind the leading edge of the first blade section of the first blade.

\* \* \* \* \*